United States Patent [19]
Buser

[11] 3,791,471
[45] Feb. 12, 1974

[54] SLOTTED CANOPY ARRANGEMENT FOR VOLKSWAGEN ENGINE COMPARTMENTS

[76] Inventor: Warren H. Buser, 3067 Beacon Ave. So., Seattle, Wash. 98144

[22] Filed: Oct. 27, 1972

[21] Appl. No.: 301,455

[52] U.S. Cl............ 180/54 A, 16/128.1, 180/69 C, 248/300
[51] Int. Cl...................... B60k 11/08, B62d 25/10
[58] Field of Search. 180/54 A, 69 C, 69 R; 296/76; 16/128.1; 248/298, 300

[56] References Cited
UNITED STATES PATENTS

| | | | |
|---|---|---|---|
| 939,368 | 11/1909 | Withem | 248/300 X |
| 974,681 | 11/1910 | Le Manquais | 248/300 |
| 2,064,380 | 12/1936 | Ledwinka | 180/54 A |
| 2,127,409 | 8/1938 | Klavik | 180/54 A |
| 2,143,889 | 1/1939 | Ledwinka | 180/54 A |
| 2,606,625 | 8/1952 | Paton | 180/69 C |
| 2,879,961 | 3/1959 | Bertram | 248/300 X |

FOREIGN PATENTS OR APPLICATIONS

| | | | |
|---|---|---|---|
| 864,701 | 1/1941 | France | 180/54 F |
| 484,424 | 5/1938 | Great Britain | 180/54 A |

*Primary Examiner*—David Schonberg
*Assistant Examiner*—Milton L. Smith
*Attorney, Agent, or Firm*—Christensen, O'Connor, Garrison & Havelka

[57] ABSTRACT

Present-day Volkswagen engine compartments tend to overheat, but the condition is relieved by providing a slot in the body of the automobile, between the air intake means in the overhanging edge portion of the body, and the hinged end portion of the hood, while at the same time assuring that the hood can be closed and latched adjacent the lower end thereof, as well as raised to the full extent necessary for access to the compartment.

9 Claims, 5 Drawing Figures

PATENTED FEB 12 1974
3,791,471
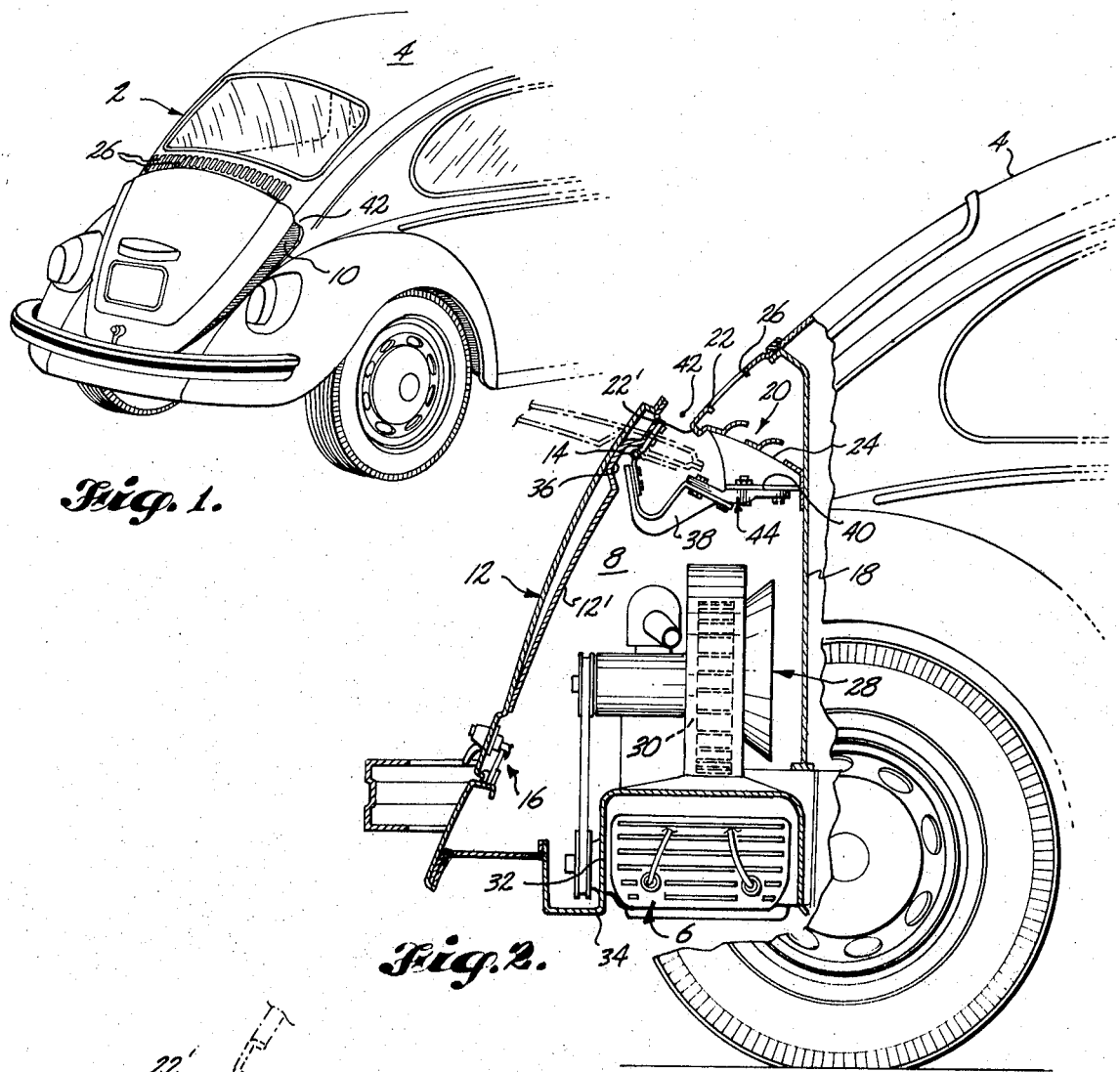
Fig.1.
Fig.2.
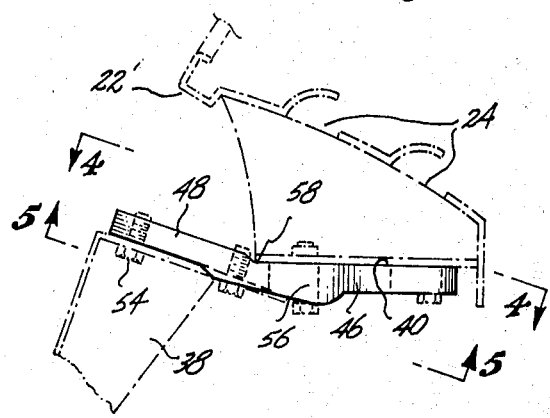
Fig.3.
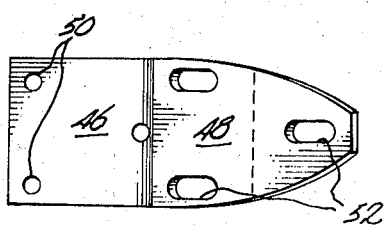
Fig.4.
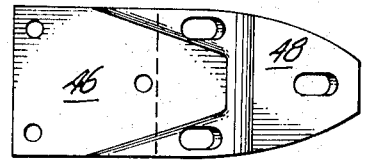
Fig.5.

SLOTTED CANOPY ARRANGEMENT FOR VOLKSWAGEN ENGINE COMPARTMENTS

BACKGROUND AND SUMMARY OF THE INVENTION

This invention relates to the cooling of an automobile engine which is designed to be cooled by air flow only, and in particular, to the cooling of an engine of this type which is housed in an open-ended compartment, the open end of which is closed by an obliquely inclined hood, the upper end portion of which is pivotally connected to the body of the automobile by a hinge disposed above the engine, and the lower end portion of which latches with the body adjacent the bottom of the open end of the compartment.

Such an engine installation is found, for example, in the Volkswagen sedan, wherein the engine is mounted at the rear of the automobile and is housed in a compartment which is closed by a hood which seals tight with the rim of the open end and fairs into the contour of the body of the automibile, in the closed position thereof. In such an installation, moreover, the rear end edge portion of the body overhangs the compartment in the manner of a lip, and has air intake means such as a series of apertures therein for the entry of air into the compartment. There is a large fan interposed in the compartment between the engine and the overhanging edge portion, by which air is drawn down into the compartment through the apertures, and discharged into the engine housing, over the engine, and out the bottom of the body for purposes of cooling the engine. This cooling arrangement was devised early in the history of installations of this nature, and for a time appeared satisfactory. However, in recent years the engines with which such automobiles are equipped, have been greatly increased in capacity, and as a result, the arrangement no longer fully satisfies the cooling requirements of the engine, particularly when the automobile is at a standstill after running hard for a time. In short, it has been found that there is such an excessive build-up of heat in the engine compartment, that the engine in turn experiences overheating, with the result that components of the engine often fail due to overheating of the oil and other lubricants which are employed in the engine.

However, I have found that such a condition can be relieved, if in addition to the usual cooling arrangement, egress is provided in the top of the compartment, above the engine, for the hot air and other gases and fumes which otherwise accumulate around the engine housing in the compartment. I accomplish this by providing a slot in the body of the automobile, between the series of apertures in the overhanging edge portion of the body, and the hinged end portion of the hood, while at the same time assuring that the hood can be closed and latched adjacent the lower end thereof, as well as raised to the full extent necessary for access to the compartment.

More particularly, the overhanging edge portion of the body terminates above the engine in a vertical plane therethrough, and the hinge for the hood is connected to the inside of the hood and mounted in a generally horizontal line spaced apart from the edge portion, relatively obliquely downwardly from the terminal edge thereof, and relatively outside of the contour of the body, so that the upper end of the hood is spaced apart from the edge of the portion in the closed and latched position thereof, to form a slot therebetween. Moreover, the hinge is connected to the hood at a point between the upper and lower ends thereof, so that the slot also operates to accommodate that portion of the hood between the hinge connection and the upper end thereof, when the hood is raised for access to the compartment.

In the case of existing automobiles, the hinge is in two parts which are mounted on a pair of generally V-shaped brackets that are arranged in spaced relationship crosswise of the automobile, and connected to the body in the space between the edge of the body and the line of the hinge. The brackets are secured to a louvered soffit which is cantilevered over the compartment from the body to brace the overhanging edge portion of the body, and which has a generally horizontally extending surface thereunder. To convert the automobile from the faired, rim-tight hood arrangement mentioned in connection with the invention, I inter-connect the brackets to the soffit by means of a pair of bracket hangers, each of which comprises a bent shoe, the heel of which is secured horizontally to the undersurface of the soffit, and the toe portion of which is upwardly obliquely canted to the heel, rearwardly of the compartment, so that by attaching the brackets to the toe portions, the hinges of the hood assume a position in which a slot is formed between the hood and the edge of the body, yet the lower end portion of the hood can be latched to the body in the closed position thereof. Preferably, the shoes are bolted to the undersurface of the soffit, and the brackets are bolted in turn to the toe portions of the shoes. Normally, the act of securing the shoes and brackets in place fixes the hood so that it can be latched to the body, notwithstanding the slot provided between it and the edge of the body; however, I prefer to provide slotted bolt holes in the toe portions of the shoes which enable the brackets to be adjusted in relation to the shoes, to assure that the hood can be latched.

BRIEF DESCRIPTION OF THE DRAWING

These features will be better understood by reference to the accompanying drawing which illustrates a presently preferred embodiment of the invention as it is applied to the conversion of an existing Volkswagen sedan to a slotted canopy arrangement.

In the drawing:

FIG. 1 is a part perspective view of the rear-end portion of the sedan after it has been converted to this arrangement;

FIG. 2 is a part cross-sectional view of the rear-end portion of the sedan;

FIG. 3 is a larger-scale, part schematic operational view of one of the hangers employed in the new arrangement;

FIG. 4 is a top view of the hanger along the line 4—4 of FIG. 3; and

FIG. 5 is a bottom view of the hanger along the line 5—5 of FIG. 3.

DESCRIPTION OF THE PREFERRED EMBODIMENT

Referring to the drawing, it will be seen that the sedan is conventional in that the wheeled chassis of the same has a smoothly streamlined body 2 thereon, the enclosure-defining canopy 4 of which slopes obliquely toward the ground at the rear, and has the engine 6 of the automobile housed therein in an open-ended compartment 8, the open end 10 of which is closed by an obliquely inclined hood 12, the upper end portion of which is pivotally connected to the body by a hinge 14 disposed above the engine. The lower end portion of the hood latches to the body adjacent the bottom of the open end, and is normally also locked in this condition by means of the conventional latch and lock device 16 illustrated. The compartment is separated from the interior of the body by a panel 18, and the canopy is cantilevered rearwardly of the panel over the compartment, and reinforced by a built-in soffit 20 which is slung between the overhanging edge portion 22 of the canopy and the panel in the compartment. The soffit and the overhanging edge portion of the canopy are equipped with louvers 24 and ports 26, respectively, through which air is intaken by means of a large exhaust fan 28, the centrifugal chamber 30 of which discharges into the engine housing 32 and empties out the underside 34 of the body for purposes of cooling the engine.

As indicated earlier, it has been found that this airflow is insufficient to maintain a satisfactory air temperature in the compartment when the sedan is equipped with a modern day high-capacity engine. However, the sedan can be converted to a satisfactory arrangement if the engine compartment is allowed to exhaust to the atmosphere through the upper side thereof, that is, through the side normally covered by the hood 12 and the overhanging edge portion 22 of the canopy.

The hood has a recess 36 in the upper inside panel 12' thereof, and the hinge 14 is bolted to the hood just above this recess, and secured in turn to a pair of generally V-shaped, smooth bighted brackets 38 which in the old arrangement, were directly bolted to the underside 40 of the soffit 20. This arrangement assured that the hood would close and latch, as well as seal with the rim of the open end 10 around the entire perimeter thereof, including that portion defined by the overhanging edge 22' of the canopy. Such a sealed condition also operated to trap the air in the compartment, and since air is intaken through the ports 26, there was no opportunity for the heated air to escape upwardly therethrough.

According to the invention, however, the sedan can be converted to an arrangement whereby the heated air can escape from the compartment through a slot 42 in the upper side thereof. This slot is formed by hanging the brackets 38 on a pair of shoes 44 which are cantilevered from the underside 40 of the soffit. Each of the shoes comprises of an apertured heel 46 which is bolted horizontally to the underside of the soffit, and a toe portion 48 which is upwardly obliquely canted from the heel, rearwardly of the compartment. The toe portions of the shoes are also apertured, and the brackets are bolted to the same so as to be rearwardly aligned therewith.

The conversion process is accomplished quite simply by removing the brackets from the soffit and interposing the shoes 44 therebetween, using the three bolt holes 50 in each heel to secure the shoes to the soffit, and the three holes 52 in each toe portion to secure the brackets to the shoes. As seen, the latter bolt holes 52 are slotted longitudinally of the shoes to enable the bolts 54 to be shifted longitudinally of the shoes for purposes of final adjustment of the hood with respect to the body.

Preferably, the mid-section 56 of each shoe is thickened to reinforce the same. The toe portion cants to the heel at approximately 16° for present day sedans, and is approximately 3 inches long to the instep 58 between the heel and the toe portion. The heel is approximately 2 ⅛th inches to the instep. The holes 50 may be tapped for cap screws.

The effect is to reduce the engine compartment temperature by 30° F or more.

What is claimed is:

1. In an automobile having a body and an air cooled engine housed in an open ended compartment at one end of the body, the open end of which compartment is closed by an obliquely inclined hood, the upper end portion of which is pivotally connected to the body by a hinge disposed above the engine, and the lower end portion of which latches with the body adjacent the bottom of the open end of the compartment, said body having an edge portion thereof overhanging the compartment, and air intake means therein for the entry of air into the top portion of the compartment above the engine, there being means interposed in the compartment between the engine and the overhanging edge portion of the body, by which air is drawn into the compartment through the air intake means, for cooling the engine, the improvement wherein a slot is provided between the overhanging edge portion of the body and the hinged upper end portion of the hood.

2. The automobile according to claim 1, wherein the overhanging edge portion of the body terminates above the engine in a vertical plane therethrough, and the hinge for the hood is connected to the inside of the hood and mounted in a generally horizontal line spaced apart from the edge portion, relatively obliquely downwardly from the terminal edge thereof, and relatively outside of the contour of the body, so that the upper end of the hood is spaced apart from the edge of the portion in the closed and latched position thereof, to form a slot therebetween.

3. The automobile according to claim 2, wherein the hinge is connected to the hood at a point between the upper and lower ends thereof, so that the slot also operates to accommodate that portion of the hood between the hinge connection and the upper end thereof, when the hood is raised for access to the compartment.

4. The automobile according to claim 2, wherein the hinge is in two parts which are mounted on a pair of generally V-shaped brackets that are arranged in spaced relationship cross-wise of the automobile, and connected to the body in the space between the edge of the portion and the line of the hinge.

5. The automobile according to claim 4, wherein the brackets are secured to a louvered soffit which is cantilevered over the compartment from the body, to brace the overhanging edge portion of the body.

6. The automobile according to claim 5, wherein the soffit has a generally hoirzontally extending surface thereunder, and the brackets are interconnected to the soffit by means of a pair of bracket hangers, each of which comprises a bent shoe, the heel of which is secured horizontally to the undersurface of the soffit, and the toe portion of which is upwardly obliquely canted to the heel, rearwardly of the compartment, and has one of the brackets attached thereto.

7. The automobile according to claim 1 wherein the air intake means take the form of apertures in the top of the overhanging edge portion of the body above the engine.

8. A hanger for use in pairs to rehang the brackets by which the upper end portion of the obliquely inclined hood closing the open end of the open ended compartment housing the air-cooled engine of an automobile at one end of the body thereof, is pivotally connected to the body of the automobile by a hinge disposed above the engine so that the hood seals tight with the rim of the open end and fairs into the contour of the body, in the closed position thereof, said body having an edge portion thereof overhanging the compartment, and air intake means therein for the entry of air into the top portion of the compartment above the engine, comprising a bent shoe, the heel of which is adapted to be secured horizontally to a surface in the top of the compartment below the overhanging edge portion of the body, and the toe portion of which is upwardly obliquely canted to the heel, for cantilevering from the surface rearwardly of the compartment, so that by attaching the brackets to the toe portions of a pair of hangers which are so secured in the compartment, the hinge of the hood will assume a position in which a slot is formed between the overhanging edge portion of the body and the hinged upper end portion of the hood, when the hood is closed and latched adjacent the lower end thereof.

9. A method of providing a slot in the body of an air cooled engine equipped automobile, at a point above the engine, said engine being housed in an open-ended compartment, the open end of which is closed by an obliquely inclined hood, the upper end portion of which is pivotally connected to the body by a hinge connected to the inside of the hood above the engine, and the lower end portion of which latches with the body adjacent the bottom of the open end of the compartment, said body having an edge portion thereof overhanging the compartment, and air intake means therein for the entry of air into the top portion of the compartment above the engine, comprising removing the hood from the body of the automobile, and thereafter replacing the hood by mounting the same on a pair of brackets which are connected at the outlying ends thereof to the hinge, and are hung from a surface in the top of the compartment below the overhanging edge portion of the body, with an extended reach rearwardly of the compartment so that the hinge is disposed on a generally horizontal line spaced apart from the overhanging edge portion of the body, relatively obliquely downwardly from the terminal edge thereof, and relatively outside of the contour of the body, thereby forming a slot between the hinged upper end portion of the hood and the overhanging edge portion of the body, in the closed and latched position of the hood.

* * * * *